United States Patent
Chen et al.

(10) Patent No.: US 7,337,311 B2
(45) Date of Patent: Feb. 26, 2008

(54) METHOD FOR CONTROLLING UPGRADE OF FIRMWARE

(75) Inventors: Yunti Chen, Taipei (TW); Tien-So Huang, Taipei (TW); Chung-Hsuan Kuo, Taipei (TW)

(73) Assignee: Giga-Byte Technology Co., Ltd., Taipei (TW)

( * ) Notice: Subject to any disclaimer, the term of this patent is extended or adjusted under 35 U.S.C. 154(b) by 719 days.

(21) Appl. No.: 10/714,880

(22) Filed: Nov. 18, 2003

(65) Prior Publication Data

US 2005/0108700 A1    May 19, 2005

(51) Int. Cl.
*G06F 15/177* (2006.01)

(52) U.S. Cl. .......................................... 713/2; 717/168

(58) Field of Classification Search ................ 713/2; 717/168
See application file for complete search history.

(56) References Cited

U.S. PATENT DOCUMENTS 6,425,079 B1 * 7/2002 Mahmoud ..................... 713/2
6,609,127 B1 * 8/2003 Lee et al. ..................... 707/10
6,754,723 B2 * 6/2004 Kato ............................. 710/8

FOREIGN PATENT DOCUMENTS

JP    2003-303028    10/2003

* cited by examiner

*Primary Examiner*—Thuan Du
(74) *Attorney, Agent, or Firm*—Birch, Stewart, Kolasch & Birch, LLP

(57) ABSTRACT

A method for controlling upgrade of firmware of an electronic device comprising process of forming a hardware ID code; forming a firmware ID code; and checking said firmware ID code and hardware ID code and upgrading said firmware. A coding method is applied for management of software and hardware versions of the device. According to the codes, the entireness and correctness of a firmware is checked before recording the firmware, so that any unintentional mistake or intentional change to the firmware file can be prevented. The compatibility of the firmware file to the hardware and the system resource capacity of the hardware are confirmed in order to prevent from failure during updating.

21 Claims, 4 Drawing Sheets

METHOD FOR CONTROLLING UPGRADE OF FIRMWARE

BACKGROUND OF THE INVENTION

1. Field of the Invention

The invention generally relates to a method for controlling upgrade of software in an electronic device, and particularly relates to a method for controlling upgrade of firmware of an electronic device, such as a computer, in an intelligent, self-protective manner.

2. Related Art

Firmware is a key component in an electronic device, such as a computer, that stores program and data in a read only memory of the device, which is unchangeable under user operations.

An electronic device, especially an information processing device, is usually found of insufficient functions or "bugs" that require to be upgraded or corrected after being made and sold. The firmware that stores the operational software and data then has to be upgraded. It has been a trend that manufacturers provide firmware upgrade means for improving the functions of a device, lengthening its usage lifetime and saving user's investment. However, the firmware upgrade encounters two conflicted demands. First, the firmware should be well protected that cannot be easily modified and caused of system failure. Second, the firmware has to be easily upgraded so as to improve or remedy the performance or function of the device.

Therefore, when upgrading a firmware, the operator has to be very careful. Otherwise, a wrong operation or wrong version of firmware may cause a serious result to the device such as total malfunction of the system. However, conventional process of firmware upgrade does not provide any controlling or preventive mechanism to avoid the danger so that the device is easily damaged by a false upgrade of firmware.

SUMMARY OF THE INVENTION

The object of the invention is to provide a method for controlling upgrade of firmware of an electronic device. A coding method is applied for management of software and hardware versions of the device. According to the codes, the entireness and correctness of a firmware is checked before recording the firmware, so that any unintentional mistake or intentional change to the firmware file can be prevented. The compatibility of the firmware file to the hardware and the system resource capacity of the hardware are confirmed in order to prevent from failure during updating.

A method for controlling upgrade of firmware of an electronic device according to the invention includes steps of forming a hardware ID code, forming a firmware ID code, checking the firmware ID and hardware ID codes and upgrading the firmware.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

The invention applies a coding method for managing software and hardware versions of the device. The hardware version relates to the construction of the device. The software version relates to the operational software of the device. Preferred embodiments of the hardware and software version are described below.

Hardware Version

A hardware version is used to identify the compatibility of the firmware to the hardware. The data of hardware version includes the following portions:

| Vender/Product ID | V | C | P | H | R |
|---|---|---|---|---|---|

In which, Vender/Product ID relates to the vender name and the product name; V is a byte of vender code; C is a byte of CPU code because CPU is an important component correlative to the firmware version; P is a byte of product code; H is a byte of hardware (circuit board) code and R is a reserved byte for extension. For example, a hardware version is like this:

| Vender/Product ID | | | | | | | | V | C | P | H | R |
|---|---|---|---|---|---|---|---|---|---|---|---|---|
| G | I | G | A | B | Y | T | E | 4 | 0 | 1 | G | C | B | 1 | 0 |

In application, when a serial of products are developed with different hardware components (such as CPUs or circuit boards), the identification can be made through the C (CPU) or H (circuit board) code. Also, when the devices are supplied by different venders, the V code registers the difference so that a firmware made by a vendor A can be controlled to avoid from being used to a hardware of vendor B, and the relative rights are protected.

Software Version

A software version is used to identify different versions of software (firmware files) that are applicable to a same hardware. A software version may include the following portions:

| A | B | B | B | C | C |
|---|---|---|---|---|---|

In which, A is a byte of main version (major function improvement) code; the first B byte is a code for major bug correction; the second and third B bytes are codes for secondary bug corrections; the CC bytes are codes of specified version, such as for different OEM customers or for special objects. An example of a software version is like this:

| A | B | B | B | C | C |
|---|---|---|---|---|---|
| 1 | 0 | 3 | 4 | 0 | 1 |

Figure 1:
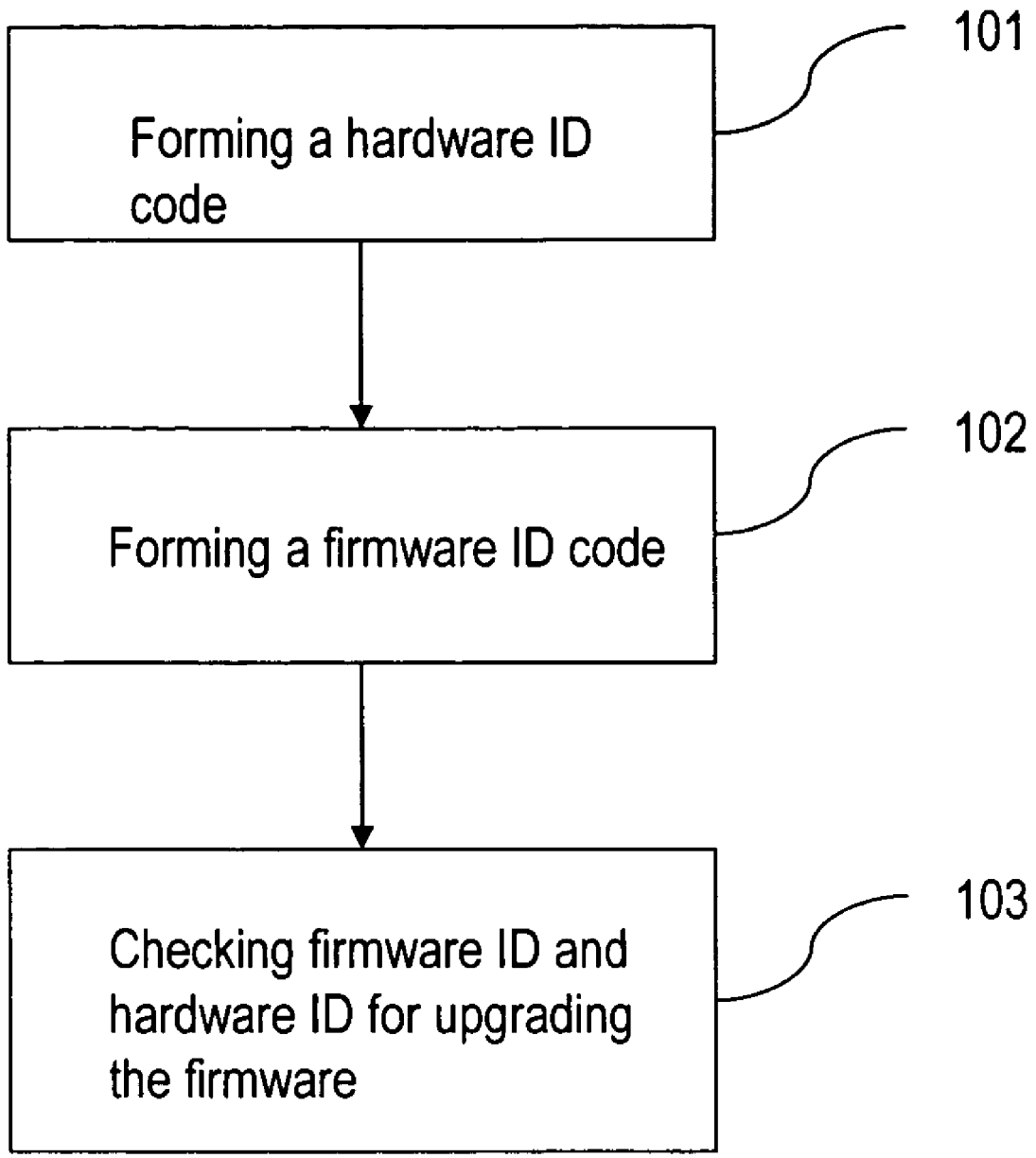
FIG. 1 is a flowchart of a method for controlling upgrade of firmware of an electronic device according to the invention.

As shown in FIG. 1, a method for controlling upgrade of firmware of an electronic device according to the invention includes process of forming a hardware ID code (step 101), forming a firmware ID code (step 102), checking the firmware ID code and hardware ID code and upgrading the firmware (step 103).

Figure 2:
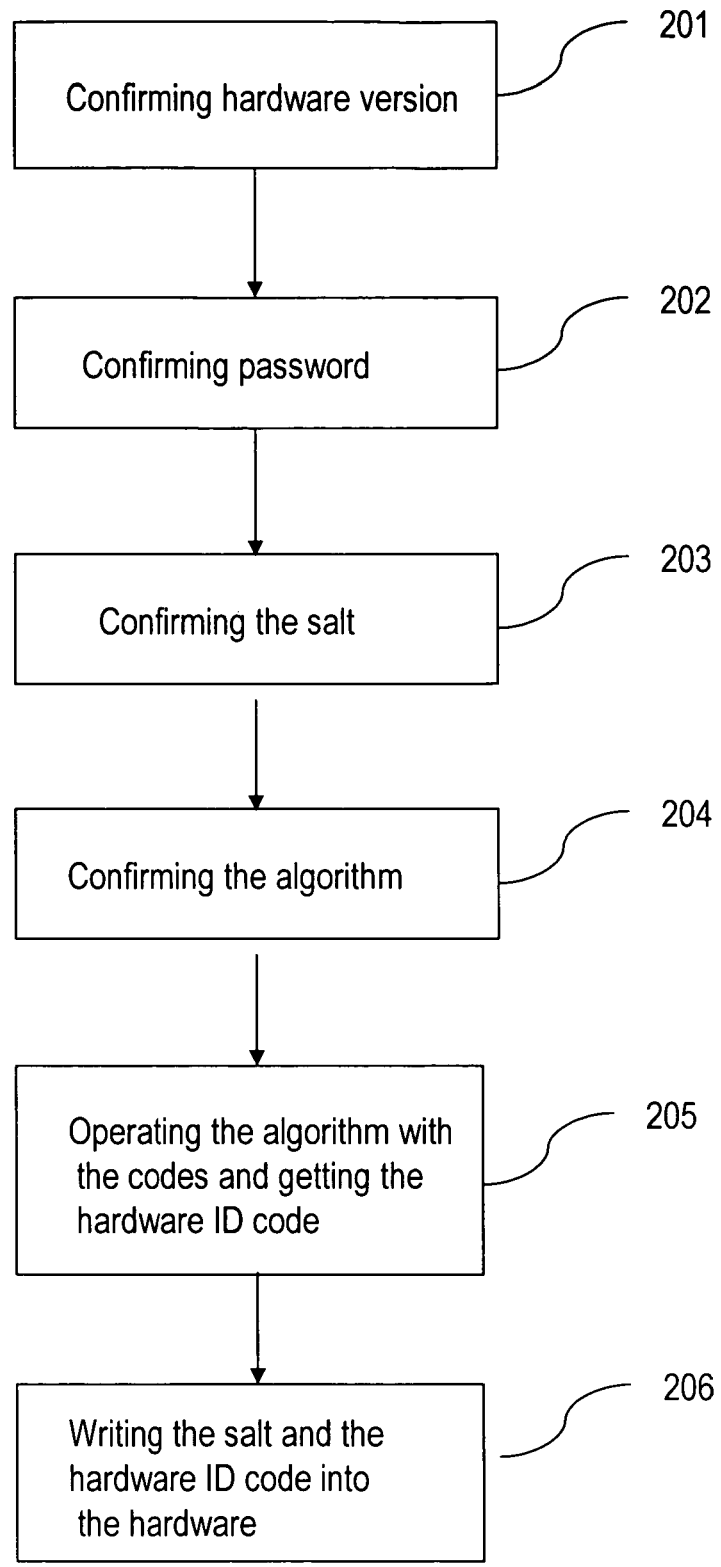
FIG. 2 is a flowchart of process of forming a hardware ID code in a method of the invention.

FIG. 2 illustrates the detailed process of forming the hardware ID code. The steps are: confirming hardware version (step 201); confirming password (step 202); confirming the salt (step 203); confirming the algorithm (step 204); operating the algorithm with the codes and getting the hardware ID code (step 205) and finally, writing the salt and the hardware ID code into the hardware (step 206). The password is secretively reserved by the developer and is not published. The salt is a code randomly generated with each computation so as to be recorded along with the hardware ID code into the hardware of the device for checking the compatibility of firmware when updating in the other days.

The algorithm is to compute XOR (logical exclusive OR) of the bytes of hardware version, password and salt, and get a hardware ID code. The operation is simple, fast and safe. An example of the algorithm and computation is listed below.

| Hardware Version | G | I | G | A | B | Y | T | E | 4 | 0 | 1 | G | C | B | 1 | 0 |
|---|---|---|---|---|---|---|---|---|---|---|---|---|---|---|---|---|
| (HEX Value) | 0x47 | 0x49 | 0x47 | 0x41 | 0x42 | 0x59 | 0x54 | 0x45 | 0x34 | 0x30 | 0x31 | 0x47 | 0x43 | 0x42 | 0x31 | 0x30 |
|  |  |  |  |  |  |  |  |  | XOR |  |  |  |  |  |  |  |
| Password | 0x01 | 0x02 | 0x03 | 0x04 | 0x05 | 0x06 | 0x07 | 0x08 | 0x09 | 0x0A | 0x0B | 0x0C | 0x0D | 0x0E | 0x0F | 0x10 |
|  |  |  |  |  |  |  |  |  | XOR |  |  |  |  |  |  |  |
| Salt | 0x0A | 0x0A | 0x0A | 0x0A | 0x0A | 0x0A | 0x0A | 0x0A | 0x0A | 0x0A | 0x0A | 0x0A | 0x0A | 0x0A | 0x0A | 0x0A |
|  |  |  |  |  |  |  |  |  | = |  |  |  |  |  |  |  |
| Hardware ID Code | 0x4C | 0x41 | 0x4E | 0x4F | 0x4D | 0x55 | 0x59 | 0x47 | 0x37 | 0x30 | 0x30 | 0x41 | 0x44 | 0x46 | 0x34 | 0x2A |

The salt and the hardware ID code are both written into a non-evaporative memory unit of the device, such as a CPLD (complex programmable logic device) or an EEPROM (electrically erasable programmable read only memory).

Figure 3:
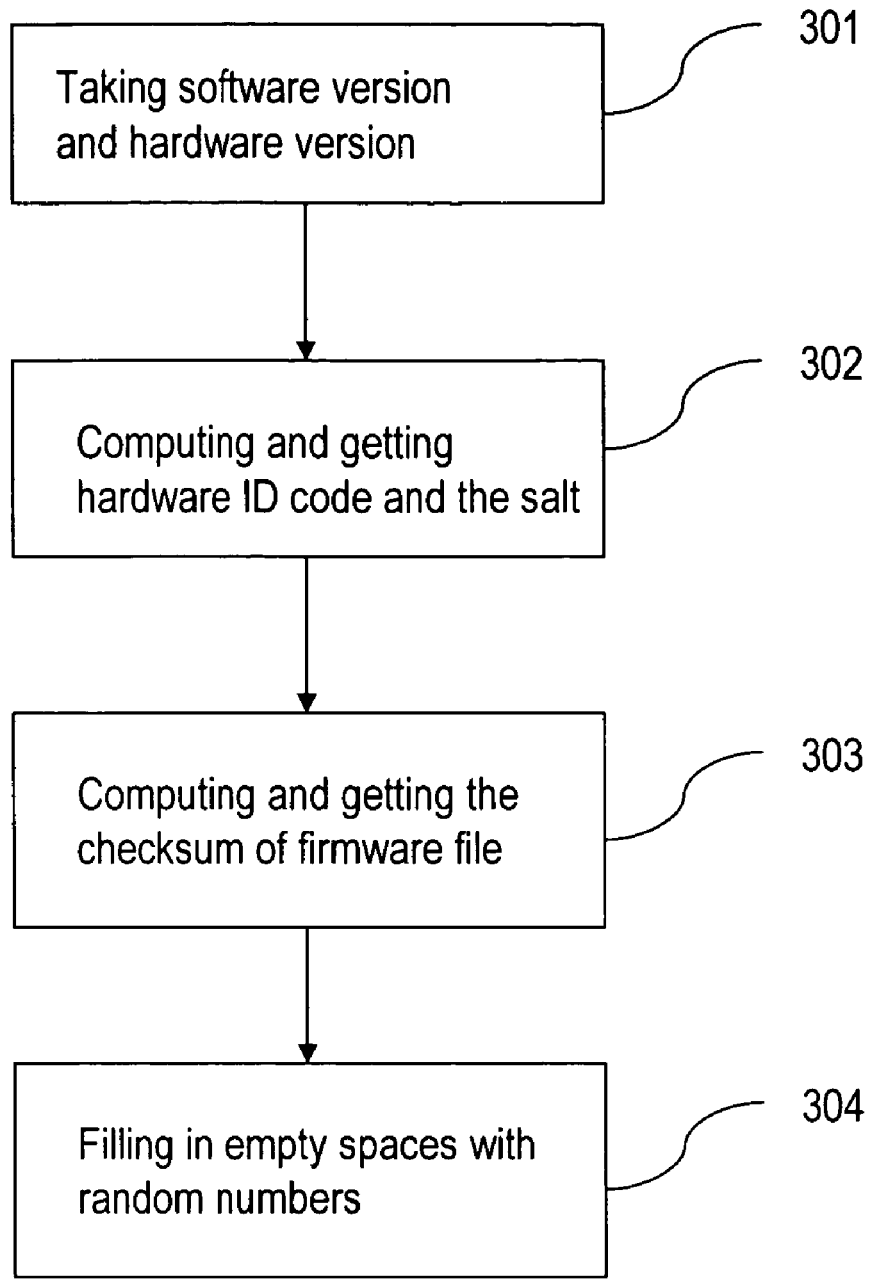
FIG. 3 is a flowchart of process of forming a firmware ID code in a method of the invention.

FIG. 3 illustrates the detailed process of forming the firmware ID code. The steps are: taking software version and hardware version (step 301); computing and getting hardware ID code and the salt (step 302); computing and getting the checksum of firmware file (step 303); and filling in empty spaces with randomized numbers (step 304).

Since the hardware ID code is computed from the hardware version, password and randomized salt, the randomized salts generate different hardware ID codes. The salt and the hardware ID code are also included in the firmware ID so as to increase the difficulty of cracking the hardware ID code.

For computing the checksum, different operations can be used. The embodiment uses XOR computation for the whole firmware content and the hardware ID code, and generates a one-byte checksum.

Filling randomized numbers in the empty spaces is to increase the difficulty of cracking the hardware ID code. Because each salt is randomly generated, the hardware ID code and the randomized numbers are hard to be identified. Filling in the randomized numbers makes the cracker hard to solve the firmware file and find out the hardware version algorithm.

A full content of a firmware ID code is as follows:

|  | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 20 h | Vender/Product ID |  |  |  |  |  |  |  |  |  |  | V | C | P | H | R |
| 30 h | CS | Rand1 | salt |  |  |  |  | H ( version(20 h-2Fh), key, salt(33 h) ) |  |  |  |  |  |  |  |  |
| 40 h | Software Dynamic Version |  |  |  |  |  |  |  | Rand2 |  |  |  |  |  |  |  |

In which, Vendor/Product ID relates to the vender name and product name; V is a byte of vender code; C is a byte of CPU code because CPU is an important component correlative to the firmware version; P is a byte of product code; H is a byte of hardware (circuit board) code; R is a reserved byte for extension; CS is a byte of checksum; salt is a byte of randomized number; H( ) is a byte of hardware ID code; Software dynamic version is a 6-byte software version code, and Rand1 and Rand2 are randomized numbers for filling the empty spaces. The following is an example of process for forming a firmware ID code.

1. Getting the software version and hardware version

|      | 0 | 1 | 2 | 3 | 4 | 5 | 6 | 7 | 8 | 9 | A | B | C | D | E | F |
|------|---|---|---|---|---|---|---|---|---|---|---|---|---|---|---|---|
| 20 h | G | I | G | A | B | Y | T | E | 4 | 0 | 1 | G | C | B | 1 | 0 |
| 30 h |   |   |   |   |   |   |   |   |   |   |   |   |   |   |   |   |
| 40 h | 1 | 0 | 1 | 2 | 3 | 4 |   |   |   |   |   |   |   |   |   |   |

2. Computing and filling in the hardware ID code and salt

|      | 0 | 1 | 2 | 3 | 4 | 5 | 6 | 7 | 8 | 9 | A | B | C | D | E | F |
|------|---|---|---|---|---|---|---|---|---|---|---|---|---|---|---|---|
| 20 h | G | I | G | A | B | Y | T | E | 4 | 0 | 1 | G | C | B | 1 | 0 |
| 30 h |   |   | salt |   |   |   | H( version(20 h-2Fh), key, salt(33 h) ) | | | | | | | | | |
| 40 h | 1 | 0 | 1 | 2 | 3 | 4 |   |   |   |   |   |   |   |   |   |   |

3. Computing and filling in the checksum

|      | 0 | 1 | 2 | 3 | 4 | 5 | 6 | 7 | 8 | 9 | A | B | C | D | E | F |
|------|---|---|---|---|---|---|---|---|---|---|---|---|---|---|---|---|
| 20 h | G | I | G | A | B | Y | T | E | 4 | 0 | 1 | G | C | B | 1 | 0 |
| 30 h | CS |  | salt |   |   |   | H( version(20 h-2Fh), key, salt(33 h) ) | | | | | | | | | |
| 40 h | 1 | 0 | 1 | 2 | 3 | 4 |   |   |   |   |   |   |   |   |   |   |

4. Filling randomized numbers in the empty spaces

|      | 0 | 1 | 2 | 3 | 4 | 5 | 6 | 7 | 8 | 9 | A | B | C | D | E | F |
|------|---|---|---|---|---|---|---|---|---|---|---|---|---|---|---|---|
| 20 h | G | I | G | A | B | Y | T | E | 4 | 0 | 1 | G | C | B | 1 | 0 |
| 30 h | CS | Rand1 | salt |   |   |   | H( version(20 h-2Fh), key, salt(33 h) ) | | | | | | | | | |
| 40 h | 1 | 0 | 1 | 2 | 3 | 4 |   |   |   |   | Rand2 | | | | | |

Figure 4:
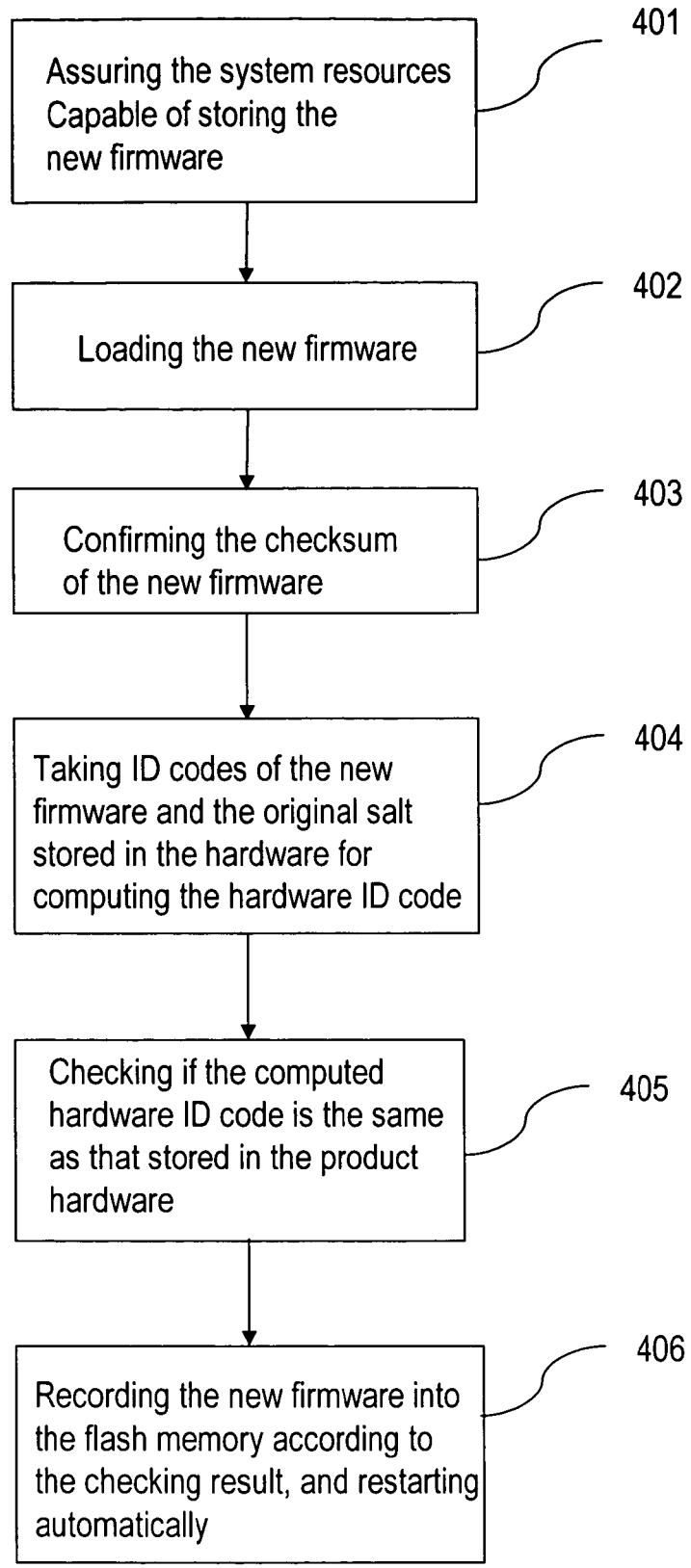
FIG. 4 a flowchart of process of checking firmware ID code and hardware ID code and upgrading the firmware in a method of the invention.

FIG. 4 a flowchart of detailed process of checking firmware ID code and hardware ID code and upgrading the firmware in a method of the invention. The steps are: assuring that the system resources are capable of storing the new firmware (step 401); loading the new firmware (step 402); confirming the checksum of the new firmware (step 403); taking ID codes of the new firmware and the original salt stored in the hardware for computing the hardware ID code (step 404); checking whether the computed hardware ID code is the same as that stored in the product hardware (step 405) and recording the new firmware into the flash memory according to the checking result, and restarting automatically (step 406). In the process, if the system resources are insufficient, or the checking result is not complied, a warning message is generated to inform the user to restart.

In conclusion, a method for controlling upgrade of firmware of an electronic device according to the invention has the following advantages:

a) The loaded firmware file is verified through a checksum that prevents any intentional or unintentional modification to the file;

b) By checking the computed hardware ID code with the one stored in the product hardware, any intentional or unintentional upgrade of incorrect file is prevented;

c) The capacity of system resources is first checked before upgrading the firmware so as to prevent failure during upgrade;

d) The firmware version, compatible product and hardware specifications can be identified directly from the firmware so as to assure the correctness of firmware upgrade;

e) For crackers who intend to upgrade the firmware illegally, such as recording a firmware of vender A into a product of vender B, there are multiple mechanisms for protecting the firmware file. First, a checksum is used that any modification of the file causes a checksum error. Second, a password is required for computing the hardware ID code; the password is not published. Third, randomized salts are generated for computing hardware ID codes, the hardware ID code and some other randomized numbers are hard to be identified. Filling in the randomized numbers makes any cracker hard to solve the firmware file and find out the hardware version algorithm;

f) The algorithms for computing the hardware ID code and the checksum can be dynamically changed if needed. For efficiency, XOR computation is used.

Otherwise, a higher safety computation, such as MD5 (message-digest algorithm) or other algorithms can be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling upgrade of firmware of an electronic device comprising process of:
   forming a hardware ID code;
   forming a firmware ID code; and
   checking said firmware ID code and hardware ID code and upgrading said firmware,
   wherein said process of forming a hardware ID code further comprises steps of:
   confirming hardware version;
   confirming a password;
   confirming a salt;
   confirming an algorithm;
   operating said algorithm with said hardware version, password and salt and getting a hardware ID code; and
   writing said salt and hardware ID code into said hardware.

2. A method for controlling upgrade of firmware of an electronic device according to claim 1 wherein said hardware version is in a format comprising:
   a Vender/Product ID related to the vender name and the product name;
   a byte of vender code;
   a byte of CPU code;
   a byte of product code;
   a byte of hardware code; and
   a reserved byte for extension.

3. A method for controlling upgrade of firmware of an electronic device according to claim 1 wherein said firmware ID code is in a format comprising:
   Vendor/Product ID related to the vender name and product name;
   a byte of vender code;
   a byte of CPU code;
   a byte of product code;
   a byte of hardware code;
   a reserved byte for extension;
   a byte of checksum;
   a byte of randomized number;
   a byte of hardware ID code;
   a 6-byte software version code, and
   randomized numbers for filling the empty spaces.

4. A method for controlling upgrade of firmware of an electronic device according to claim 1 wherein said salt is randomly generated, and being different each time.

5. A method for controlling upgrade of firmware of an electronic device according to claim 1 wherein said algorithm is logical exclusive OR operation.

6. A method for controlling upgrade of firmware of an electronic device according to claim 1 wherein said algorithm is MD5 message-digest algorithm.

7. A method for controlling upgrade of firmware of an electronic device according to claim 1 wherein said salt and said hardware ID code are both written into said device and stored in a non-evaporative memory unit of said hardware.

8. A method for controlling upgrade of firmware of an electronic device according to claim 7 wherein said non-evaporative memory unit is a complex programmable logic device.

9. A method for controlling upgrade of firmware of an electronic device according to claim 7 wherein said non-evaporative memory unit is an electrically erasable programmable read only memory.

10. A method for controlling upgrade of firmware of an electronic device comprising process of:
    forming a hardware ID code;
    forming a firmware ID code; and
    checking said firmware ID code and hardware ID code and upgrading said firmware,
    wherein said process of forming a firmware ID code further comprises steps of:
    taking software version and hardware version;
    computing and getting said hardware ID code and said salt;
    computing and getting a checksum of firmware file; and
    filling in empty spaces with random numbers.

11. A method for controlling upgrade of firmware of an electronic device according to claim 10 wherein said hardware version is in a format comprising:
    Vender/Product ID related to the vender name and the product name;
    a byte of vender code;
    a byte of CPU code;
    a byte of product code;
    a byte of hardware code; and
    a reserved byte for extension.

12. A method for controlling upgrade of firmware of an electronic device according to claim 10 wherein said software version is in a format comprising:
    a byte of main version code;
    a code for major bug correction;
    codes for secondary bug corrections; and
    codes of specified version.

13. A method for controlling upgrade of firmware of an electronic device according to claim 10 wherein said salt is randomly generated, and being different each time.

14. A method for controlling upgrade of firmware of an electronic device according to claim 10 wherein said computing is algorithm of logical exclusive OR operation.

15. A method for controlling upgrade of firmware of an electronic device according to claim 10 wherein said computing is algorithm of MD5 message-digest algorithm.

16. A method for controlling upgrade of firmware of an electronic device comprising process of:
    forming a hardware ID code;
    forming a firmware ID code; and
    checking said firmware ID code and hardware ID code and upgrading said firmware,
    wherein said process of checking said firmware ID code and hardware ID code and upgrading said firmware further comprises steps of:
    assuring system resources capable of storing a new firmware;

loading said new firmware;

confirming a checksum of said new firmware;

taking ID codes of said new firmware and an original salt stored in said hardware for computing a hardware ID code;

checking if said computed hardware ID code is same as that stored in said product hardware; and recording said new firmware into a flash memory according to said checking result, and restarting automatically.

17. A method for controlling upgrade of firmware of an electronic device according to claim 16 wherein said salt is randomly generated, and being different each time.

18. A method for controlling upgrade of firmware of an electronic device according to claim 16 wherein said computing is algorithm of logical exclusive OR operation.

19. A method for controlling upgrade of firmware of an electronic device according to claim 16 wherein said computing is algorithm of MD5 message-digest algorithm.

20. A method for controlling upgrade of firmware of an electronic device according to claim 16 wherein during said step of assuring system resources capable of storing a new firmware, a warning message is generated to inform user to restart when said system resources are insufficient.

21. A method for controlling upgrade of firmware of an electronic device according to claim 16 wherein during said steps of confirming and checking, a warning message is generated to inform user to restart when a checking result is not complied.

* * * * *